(12) United States Patent
Yoo et al.

(10) Patent No.: US 12,365,276 B2
(45) Date of Patent: Jul. 22, 2025

(54) SEAT VENTILATION DEVICE FOR VEHICLES

(71) Applicants: HYUNDAI MOTOR COMPANY, Seoul (KR); KIA CORPORATION, Seoul (KR); HYUNDAI TRANSYS INC., Seosan-si (KR)

(72) Inventors: Han Su Yoo, Hwaseong-si (KR); Hyeong Jong Kim, Seoul (KR); Dong Woo Jeong, Gwacheon-si (KR); Byung Yong Choi, Hwaseong-si (KR); Ho Sub Lim, Hwaseong-si (KR); Hwa Jun Lee, Hwaseong-si (KR); Jae Hyun Park, Hwaseong-si (KR)

(73) Assignees: HYUNDAI MOTOR COMPANY, Seoul (KR); KIA CORPORATION, Seoul (KR); HYUNDAI TRANSYS INC., Seoul (KR)

( * ) Notice: Subject to any disclaimer, the term of this patent is extended or adjusted under 35 U.S.C. 154(b) by 208 days.

(21) Appl. No.: 18/367,653

(22) Filed: Sep. 13, 2023

(65) Prior Publication Data
US 2024/0208380 A1    Jun. 27, 2024

(30) Foreign Application Priority Data
Dec. 23, 2022   (KR) .................. 10-2022-0182574

(51) Int. Cl.
*B60N 2/56* (2006.01)
*B60H 3/06* (2006.01)

(52) U.S. Cl.
CPC ......... *B60N 2/5635* (2013.01); *B60H 3/0658* (2013.01); *B60H 2003/0675* (2013.01)

(58) Field of Classification Search
CPC .................................... B60N 2/5635
See application file for complete search history.

(56) References Cited

U.S. PATENT DOCUMENTS

| 6,105,667 | A  | * | 8/2000 | Yoshinori | B60N 2/5657 219/202 |
|---|---|---|---|---|---|
| 2005/0188849 | A1 | * | 9/2005 | Yoneno | B60N 2/5657 96/143 |
| 2006/0254284 | A1 | * | 11/2006 | Ito | B60N 2/5635 62/3.61 |
| 2006/0272337 | A1 | * | 12/2006 | Ito | B60N 2/5635 62/3.61 |
| 2019/0135145 | A1 | * | 5/2019 | Zhang | B60N 2/5621 |

* cited by examiner

*Primary Examiner* — Richard G Davis
(74) *Attorney, Agent, or Firm* — MCDONNELL BOEHNEN HULBERT & BERGHOFF LLP

(57) ABSTRACT

A seat ventilation device for vehicles which is configured to perform both an air cleaning function and a seat ventilation function, and is operated to perform one selected function. The seat ventilation device includes a base duct mounted in a seat and having an indoor outlet configured to discharge air to an interior of a vehicle, a blower assembled with the base duct, configured to intake air in the interior of the vehicle and selectively connected to the indoor outlet, a cover duct mounted on the base duct and having a seat outlet selectively connected to the blower so as to discharge air to the seat, an air cleaning module mounted on the blower so as to filter the air taken in through the blower, and an opening and closing door located in the cover duct and configured to open selectively either the seat outlet or the indoor outlet.

12 Claims, 13 Drawing Sheets

SEAT VENTILATION DEVICE FOR VEHICLES

CROSS REFERENCE TO RELATED APPLICATIONS

This application claims under 35 U.S.C. § 119(a) the benefit of priority to Korean Patent Application No. 10-2022-0182574 filed on Dec. 23, 2022, the entire contents of which are incorporated herein by reference.

BACKGROUND

(a) Technical Field

The present disclosure relates to a seat ventilation device for vehicles. More particularly, it relates to a seat ventilation device for vehicles which may perform both an air cleaning function and a seat ventilation function.

(b) Background Art

A conventional air cleaning module for vehicles is mounted in a seat. The air cleaning module intakes air of the interior of a vehicle through an inlet provided in the lower part of the seat, filters out foreign substances from the air, and then discharges the air to the outside of the seat through an outlet provided in the upper part of the seat.

As shown in FIGS. 12 and 13, the conventional air cleaning module includes a fan 2, a filter 3, and a cover 4 which are mounted in the seat, and physically purifies air of the interior of a vehicle, which is taken in through the fan 2, by the filter 3. The air introduced into the seat 1 through an inlet 1*a* of the seat 1 is purified by the filter 3, and is then discharged to the outside of the seat 1 through an outlet 1*b* of the seat 1.

The conventional air cleaning module may physically filter out foreign substances, such as dust, but may not chemically filter out substances, such as odor and bacteria, and is thus not functionally effective in an environment in which a function of chemically filtering out foreign substances is required.

Further, a seat ventilation module which discharges air to a contact region between the seat and a passenger may also be mounted in the seat.

When both the conventional air cleaning module and the seat ventilation module are mounted in the seat, there are some parts of the air cleaning module which overlap corresponding parts of the seat ventilation module, and thereby, disadvantages in terms of space, cost and weight are encountered, and fuel economy loss is incurred.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a seat ventilation device for vehicles which is configured to perform both an air cleaning function and a seat ventilation function, and is operated to perform one selected from the two functions.

In one aspect, the present disclosure provides a seat ventilation device for vehicles including a base duct mounted in a seat, and having an indoor outlet configured to discharge air to an interior of a vehicle, a blower assembled with the base duct, configured to intake air in the interior of the vehicle, and selectively connected to the indoor outlet, a cover duct mounted on the base duct, and having a seat outlet selectively connected to the blower so as to discharge air to the seat, an air cleaning module mounted at a front end of the blower so as to filter the air in the interior of the vehicle, taken in through the blower, and an opening and closing door located in the cover duct, and configured to open selectively either the seat outlet or the indoor outlet.

In an exemplary embodiment, the opening and closing door may be connected to a door actuator mounted on the base duct such that power is transmittable therebetween, and may be rotated by driving of the door actuator so as to be moved from a first position to open the indoor outlet to a second position to open the seat outlet.

In another exemplary embodiment, the door actuator may include a motor mounted on the base duct so as to generate power to rotate the opening and closing door, a slider assembled with an inside of the cover duct so as to be linearly movable, and screwed with a rotating shaft of the motor so as to be linearly moved by driving of the motor, and a wave flange provided on the opening and closing door, and configured to rotate the opening and closing door in a state of being interlocked with linear movement of the slider.

In still another exemplary embodiment, an inclined plane may be provided on an upper surface of the slider, and the wave flange may come into contact with the inclined plane at all times, and may be pressed due to movement of the slider in a first direction so as to move the opening and closing door from the first position to the second position.

In yet another exemplary embodiment, the opening and closing door may be mounted in the cover duct by a hinge shaft, and a return spring compressed by the opening and closing door rotated and moved to the second position may be mounted on the hinge shaft.

In still yet another exemplary embodiment, the wave flange may move the opening and closing door from the second position to the first position by elastic restoring force of the return spring, when the slider is moved in a second direction by driving of the motor.

In a further exemplary embodiment, a guide rail configured to guide the linear movement of the slider may be provided on an inner surface of the cover duct, and the slider may have a guide rib assembled with the guide rail so as to be movable along the guide rail.

In another further exemplary embodiment, the air cleaning module may include a housing having a filter inlet, a sterilization space configured such that air is introduced thereinto through the filter inlet, and a filter outlet configured to discharge air having passed through the sterilization space to the blower, a filter member mounted at the filter inlet, and configured to filter out foreign substances from the air introduced into the sterilization space, a photocatalytic member provided such that a substance including a photocatalyst is supported thereon and located in the sterilization space, and configured to sterilize air when light is radiated to the photocatalytic member, and a light source mounted in the housing, and configured to radiate light to the photocatalytic member.

In still another further exemplary embodiment, the motor may be controlled by a controller, and the controller may control driving of the motor depending on a user input so as to move the opening and closing door from the first position to the second position.

In yet another further exemplary embodiment, the cover duct may be mounted on the base duct to completely cover the indoor outlet.

In still yet another further exemplary embodiment, the indoor outlet may be connected to a discharge hole of the seat such that air is flowable therebetween, and may discharge air to the interior of the vehicle through the discharge hole.

In a still further exemplary embodiment, the filter inlet may be connected to an inflow duct configured such that the air in the interior of the vehicle is introduced thereinto, and the inflow duct may be connected to an inflow hole of the seat such that air is flowable therebetween.

Other aspects and exemplary embodiments of the disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
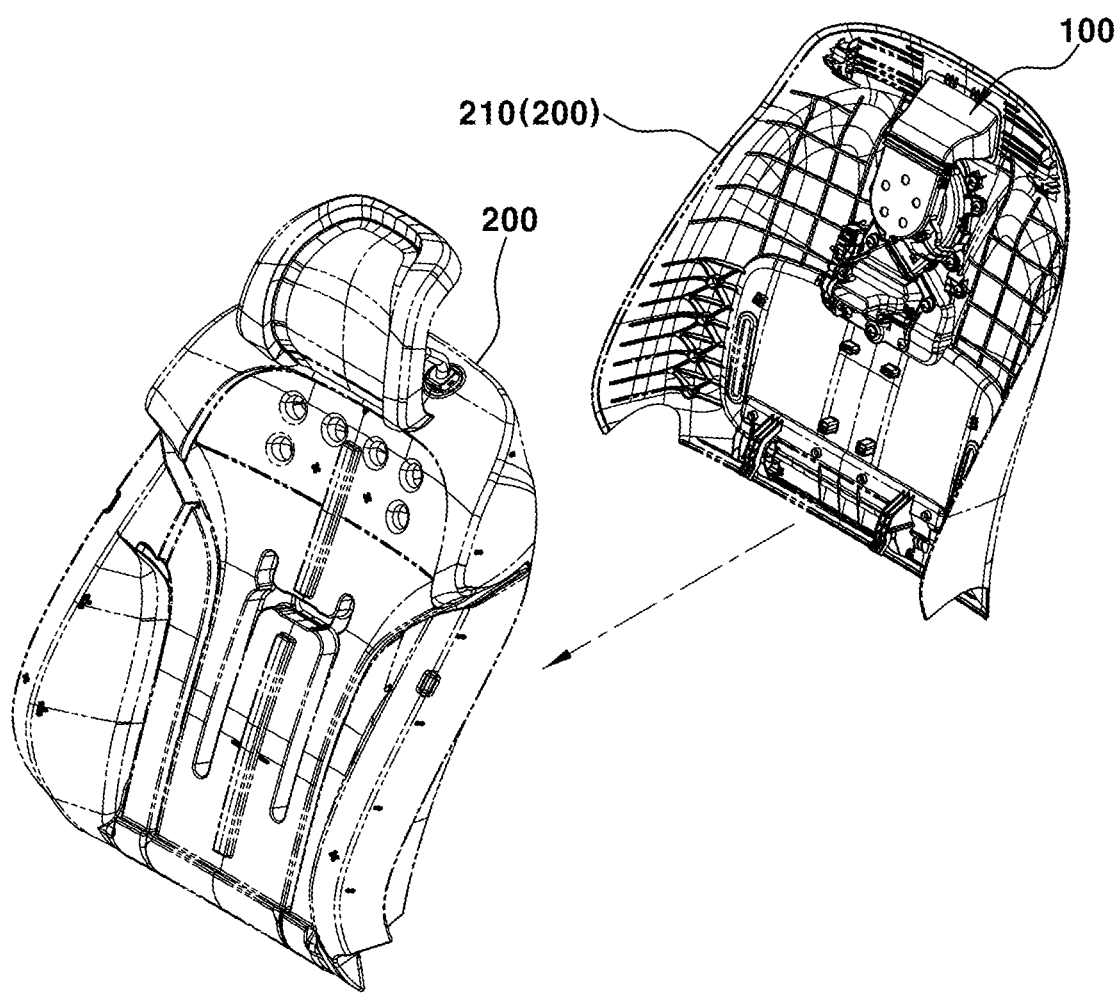
FIG. 1 is an exploded perspective view showing the structure of a seat ventilation device for vehicles according to one embodiment of the present disclosure, which is mounted in a seat.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in embodiments of the present disclosure set forth in the description which follows will be exemplarily given to describe the embodiments of the present disclosure, and the embodiments of the present disclosure may be implemented in many alternative forms.

Further, in the following description of the embodiments, it will be understood that, when a part "comprises" or "includes" an element, the part does not exclude other elements, and may further include other elements, unless the context clearly indicates otherwise.

Moreover, in the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

Hereinafter, the present disclosure will be described in detail with reference to the accompanying drawings. Matters expressed in the accompanying drawings are schematized to easily describe the embodiments of the present disclosure, and may be different from shapes that are actually implemented.

Figure 2:
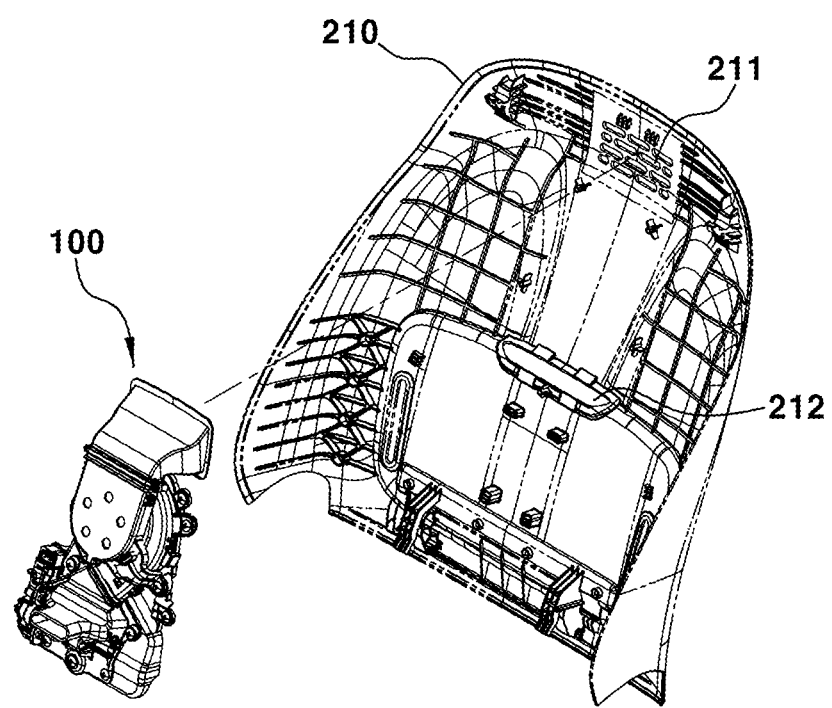
FIG. 2 is an exploded perspective view showing a seat back board with which the seat ventilation device according to one embodiment of the present disclosure is assembled.

As shown in FIG. 1, a seat ventilation device 100 for vehicles according to one embodiment of the present disclosure is mounted in a seat 200. Referring to FIG. 2, the seat ventilation device 100 is mounted on a seat back board 210, which forms the rear surface of the seat 200, and is located in the seat 200. An inflow hole 211 configured such that air is introduced into the seat 200 therethrough, and a discharge hole 212 configured such that air is discharged to the outside of the seat 200 therethrough are provided in the seat back board 210. The inflow hole 211 is disposed higher than the discharge hole 212.

Figure 3:
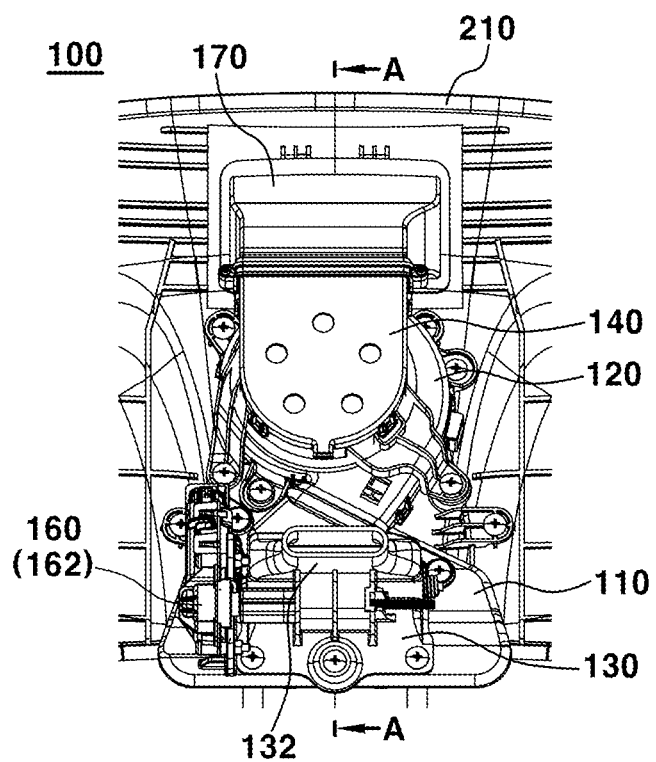
FIG. 3 is an assembled perspective view showing the seat ventilation device according to one embodiment of the present disclosure.
Figure 4:
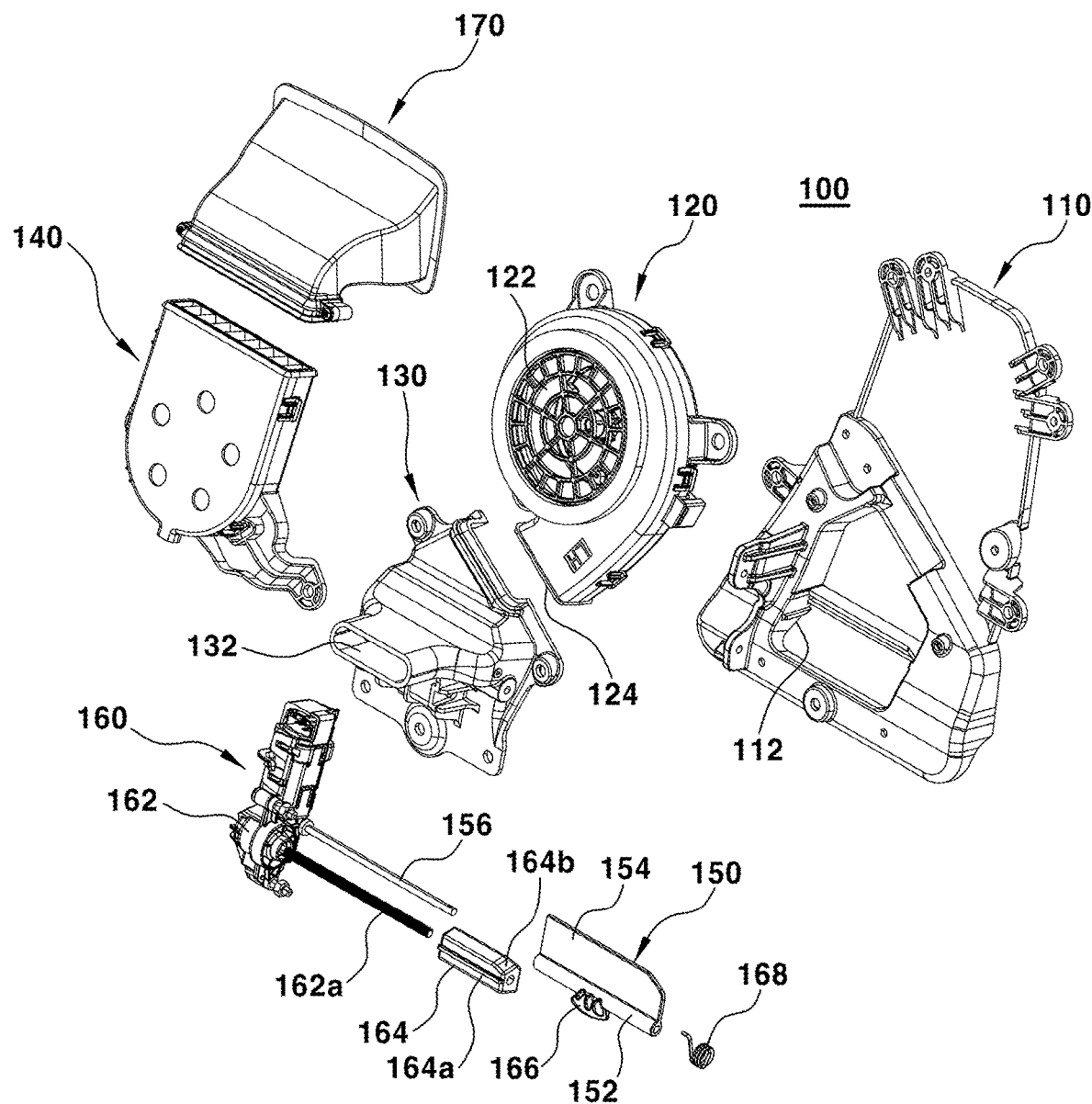
FIG. 4 is an exploded perspective view showing the seat ventilation device according to one embodiment of the present disclosure.
Figure 5:
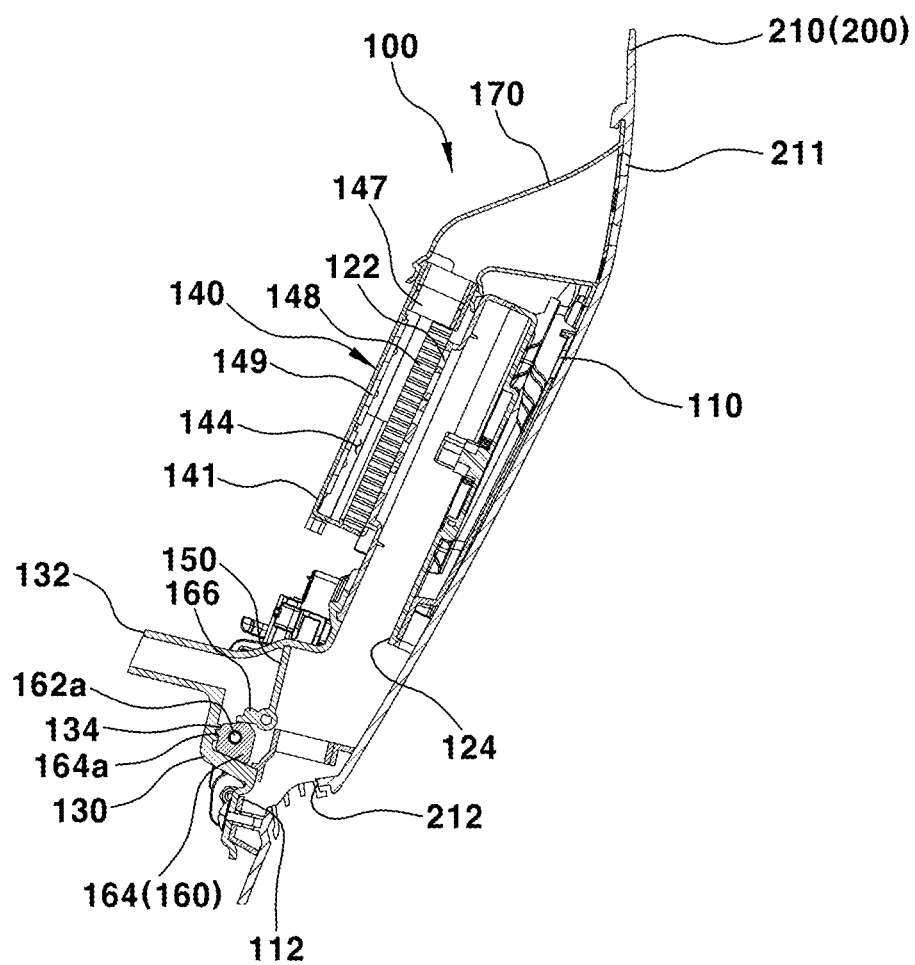
FIG. 5 is a longitudinal-sectional view taken along line A-A of FIG. 3.

As shown in FIGS. 3 to 5, the seat ventilation device 100 includes a base duct 110, a blower 120, a cover duct 130, an air cleaning module 140, an opening and closing door 150, a door actuator 160, etc.

The base duct 110 is mounted on the inner surface of the seat back board 210 so as to be located in the seat 200. The base duct 110 has an indoor outlet 112 configured to discharge air introduced into the seat ventilation device 100 to the interior of a vehicle. The base duct 110 is installed on the seat back board 210 such that the indoor outlet 112 is directly connected to the discharge hole 212 of the seat back board 210. The indoor outlet 112 is provided on the lower part of the base duct 110, and the upper part of the base duct 110 has no structure for air flow.

The blower 120 is mounted on the upper part of the base duct 110, and is connected to the inflow hole 211 of the seat back board 210 so as to intake air in the interior of the vehicle. The blower 120 is connected to the inflow hole 211 through an inflow duct 170 and the air cleaning module 140 such that air is flowable between the blower 120 and the inflow hole 211.

The blower 120 has an air inlet 122 configured such that air in the interior of vehicle is taken in therethrough, and an air outlet 124 configured such that the air taken in is blown to the interior of the vehicle or the inside of the seat 200 therethrough. The air inlet 122 is directly connected to the air cleaning module 140 such that air is flowable therebetween, and the air outlet 124 is selectively connected to a seat outlet 132 of the cover duct 130 and the indoor outlet 112 of the base duct 110 such that air is flowable therebetween.

Air in the interior of the vehicle is taken into the seat ventilation device 100 through the inflow hole 211 of the seat back board 210 by driving of the blower 120, and flows along a selected path. Concretely, the air in the interior of the vehicle flows in the order of the inflow hole 211, the inflow duct 170, the air cleaning module 140, and the blower 120, and is blown from the blower 120 to the inside of the seat 200 through the seat outlet 132 or to the inside of the vehicle through the indoor outlet 112 and the discharge hole 212.

The cover duct 130 is mounted on the lower part of the base duct 110 to completely cover the indoor outlet 112 so as to seal the indoor outlet 112. The cover duct 130 is selectively connected to the blower 120 such that air is flowable therebetween, and has the seat outlet 132 configured to discharge air to the surface of the seat 200 (i.e., opposite the seat back board 210) with which a passenger seated on the seat 200 comes into contact. As shown in FIG. 5, the front end of the cover duct 130 in an air flow direction is directly connected to the air outlet 124 of the blower 120 such that air is flowable therebetween.

The air cleaning module 140 is mounted at the front end of the blower 120 in the air flow direction so that air in the interior of the vehicle taken in by the blower 120 is introduced into the air cleaning module 140. The air cleaning module 140 is connected to the inflow hole 211 of the seat back board 210 through the inflow duct 170 such that air is flowable therebetween, and has a filter outlet 143 directly connected to the air inlet 122 of the blower 120. The inflow duct 170 is connected to a filter inlet 142 of the air cleaning module 140, and is directly connected to the inflow hole 211 such that air is flowable therebetween.

The air cleaning module 140 is configured to, when air in the interior of the vehicle taken in by driving of the blower 120 is supplied from the inflow duct 170, filter and sterilize the air.

Figure 6:
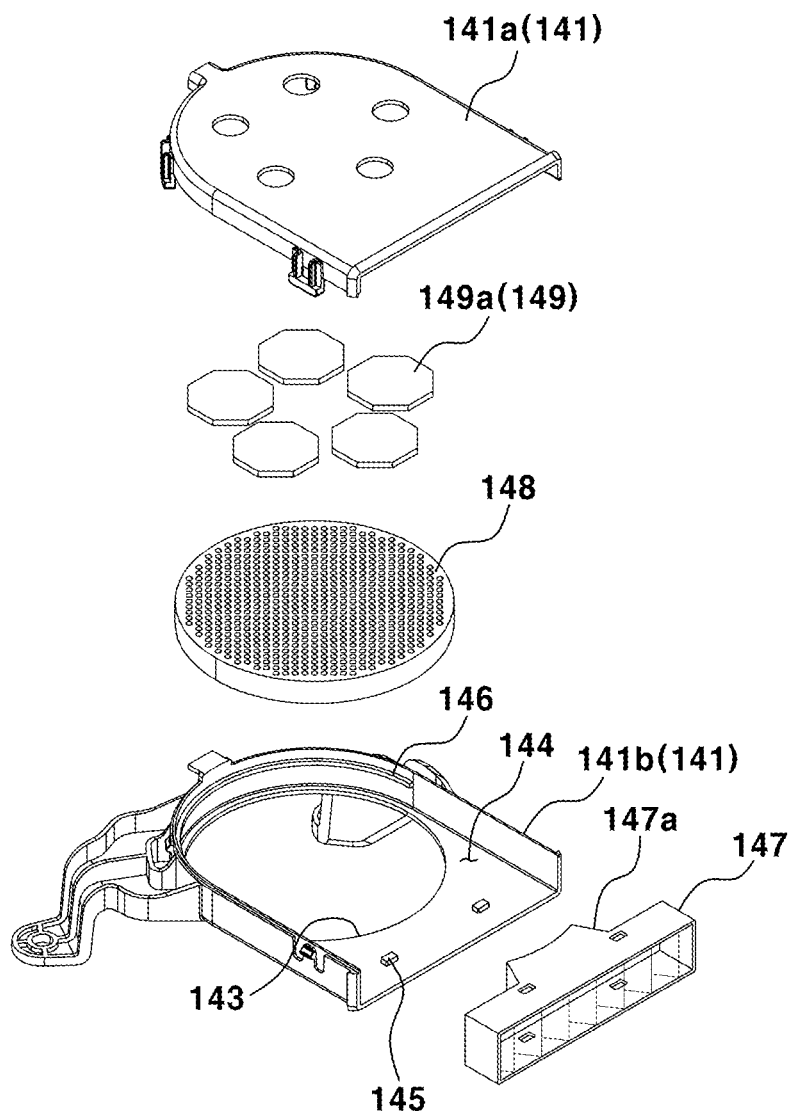
FIG. 6 is an exploded perspective view showing an air cleaning module of the seat ventilation device according to one embodiment of the present disclosure.
Figure 7:
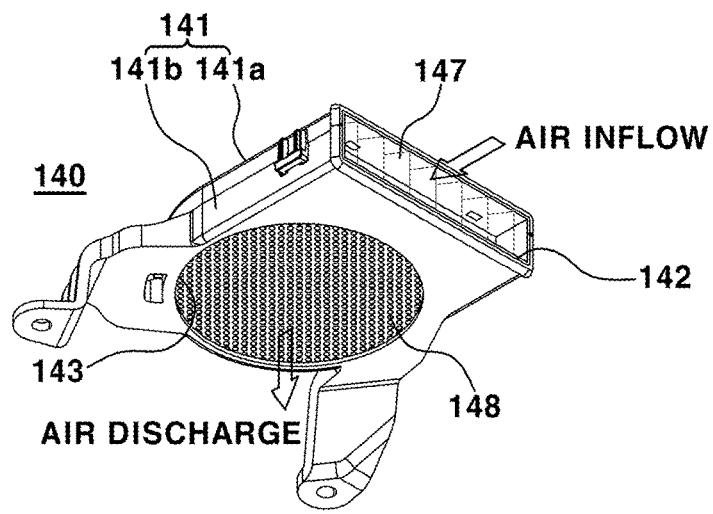
FIG. 7 is an assembled perspective view showing the air cleaning module according to one embodiment of the present disclosure.

As shown in FIGS. 5 to 7, the air cleaning module 140 includes a housing 141, a filter member 147, a photocatalytic member 148, and a light source 149.

The housing 141 includes an upper housing 141a, and a lower housing 141b coupled to the upper housing 141a. The housing 141 has the filter inlet 142 configured such that air is introduced into the housing 141 therethrough, an inner space (i.e., a sterilization space) 144 into which air is introduced through the filter inlet 142, and the filter outlet 143 configured such that air sterilized by the sterilization space 144 is discharged to the blower 120 therethrough.

The filter member 147 is mounted on the front end of the housing 141 so as to be located at the front end of the sterilization space 144 and the filter inlet 142. The filter member 147 may be assembled to be caught on protrusions 145 protruding from the inner surface of the housing 141, and may thus be fixed to the filter inlet 142. The filter member 147 filters out foreign substances from air introduced into the sterilization space 144 through the filter inlet 142. The air, from which the foreign substances are primarily removed by the filter member 147, flows toward the sterilization space 144.

The photocatalytic member 148 is mounted in the housing 141 so as to be located in the sterilization space 144. Concretely, the photocatalytic member 148 is located at the rear end of the sterilization space 144 in the flow direction of air in the housing 141. The photocatalytic member 148 is configured such that a substance including a photocatalyst is supported thereon, and sterilizes and deodorizes air when light is radiated to the photocatalytic member 148. The photocatalyst may be supported on a circular pad having a designated thickness, and rectangular holes may be formed in the pad so as to increase the surface area of the pad. The photocatalyst reacts to light radiated to the photocatalyst, and thus accelerates chemical reaction of air. The photocatalyst accelerates photochemical reaction of air passing through the photocatalytic member 148 (i.e., air passing through the pad on which the photocatalyst is supported), and removes bacteria from the air.

The photocatalytic member 148 is located at the front end of the filter outlet 143 in the air flow direction, and comes into contact with the lower housing 141b and the filter member 147 so as to be supported thereby. The rear surface of the photocatalytic member 148 comes into contact with the lower housing 141b so as to be supported thereby, and the outer circumferential surface of the photocatalytic member 148 comes into contact with the lower housing 141b and the filter member 147 so as to be supported thereby. The rear surface of the photocatalytic member 148 is the rear surface of the photocatalytic member 148 in the flow direction of air passing through the photocatalytic member 148.

In order to support the photocatalytic member 148, the filter member 147 has a photocatalytic contact part 147a which may come into surface contact with the outer circumferential surface of the photocatalytic member 148, at the rear end of the filter member 147, and the lower housing 141b has a structure which may come into surface contact with the outer circumferential surface and the rear surface of the photocatalytic member 148. Further, a movement prevention rib 146 protrudes from the inner circumferential surface of the lower housing 141b. The movement prevention rib 146 is stacked on the front surface of the photocatalytic member 148 when the photocatalytic member 148 comes into contact with the inner circumferential surface of the lower housing 141b, and may thus prevent movement of the photocatalytic member 148.

The photocatalytic member 148 sterilizes and purifies air introduced into the sterilization space 144 when the light source 149 radiates light to the photocatalytic member 148.

The light source 149 is mounted in the housing 141, and is configured to radiate light to the photocatalytic member 148. The light source 149 is fixedly assembled with the inner surface of the upper housing 141a, and is disposed to be spaced apart from the photocatalytic member 148 in the flow direction of air passing through the photocatalytic member 148. The light source 149 may include a plurality of ultraviolet light emitting diodes 149a. The light source 149 may selectively radiate light to the photocatalytic member 148 depending on whether or not power is supplied. The light source 149 radiates light including ultraviolet rays to the photocatalytic member 148. The ultraviolet LEDs 149a may employ a combination of two or more different kinds of ultraviolet LEDs which emit different wavelengths. The ultraviolet LEDs 149a may be arranged in the circumferential direction of the photocatalytic member 148 in front of the photocatalytic member 148, and two or more kinds of ultraviolet LEDs may be alternately arranged.

Although the light source 149 itself may sterilize and deodorize air without chemical reaction with the photocatalyst, the light source 149 may accelerate chemical reaction of air and may increase sterilization and deodorization effects through the chemical reaction of the photocatalytic member 148.

Figure 8:
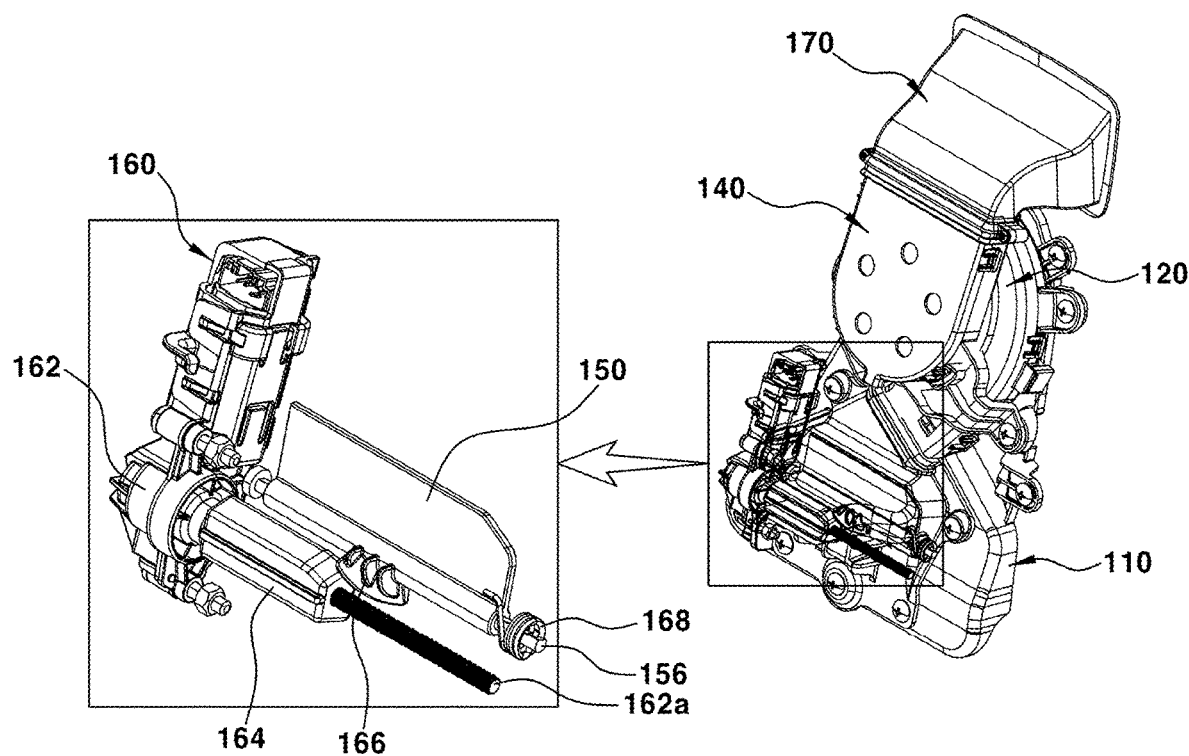
FIG. 8 is a view sowing the assembled structure of a door actuator for the seat ventilation device according to one embodiment of the present disclosure.

As shown in FIGS. 5 and 8, the opening and closing door 150 is coupled to the cover duct 130 so as to be disposed in the cover duct 130. Here, the opening and closing door 150 is located in a space surrounded by the cover duct 130 and the base duct 110. The opening and closing door 150 is configured to open any one of the seat outlet 132 of the cover duct 130 and the indoor outlet 112 of the base duct 110 and to close the other.

The opening and closing door 150 is connected to the door actuator 160 mounted on the base duct 110 such that power is transmittable therebetween, and is moved to a selected position by driving of the door actuator 160. The opening and closing door 150 is selectively located at any one of a first position (with reference to FIGS. 9A and 9B) to open the indoor outlet 112 of the base duct 110 and a second position (with reference to FIGS. 10A and 10B) to open the seat outlet 132 of the cover duct 130. The opening and closing door 150 may be rotated to be moved from any one of the first position and the second position to the other.

Figure 9A:
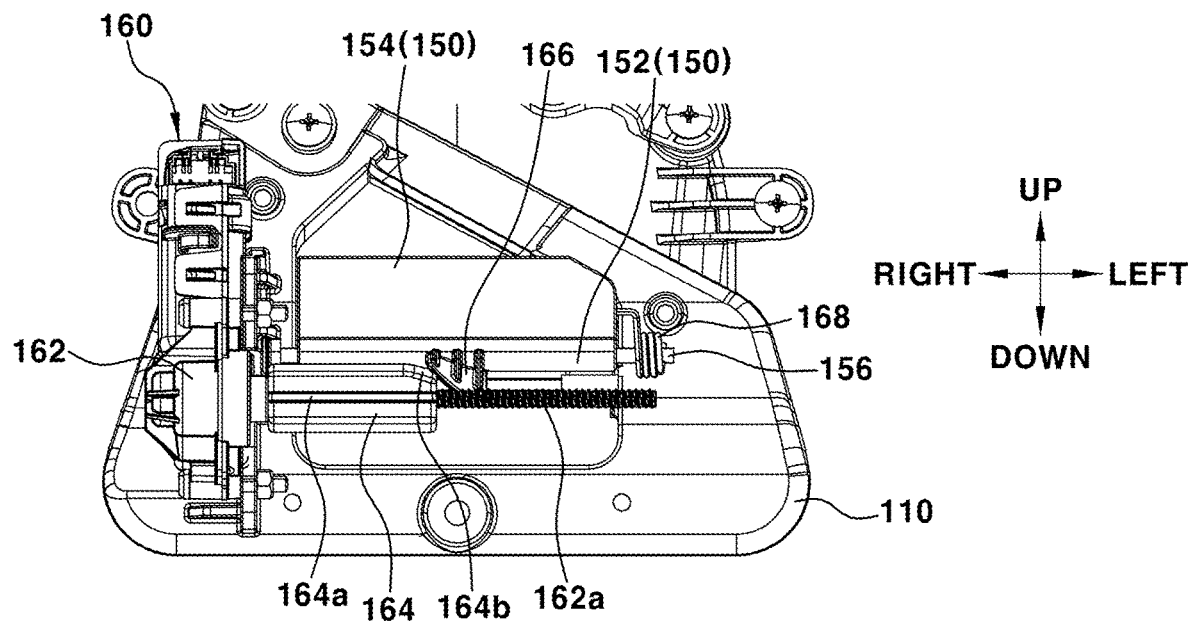
FIGS. 9A and 9B are views showing the state in which an opening and closing door is located at a position to open an indoor outlet by driving of the door actuator according to one embodiment of the present disclosure.
Figure 9B:
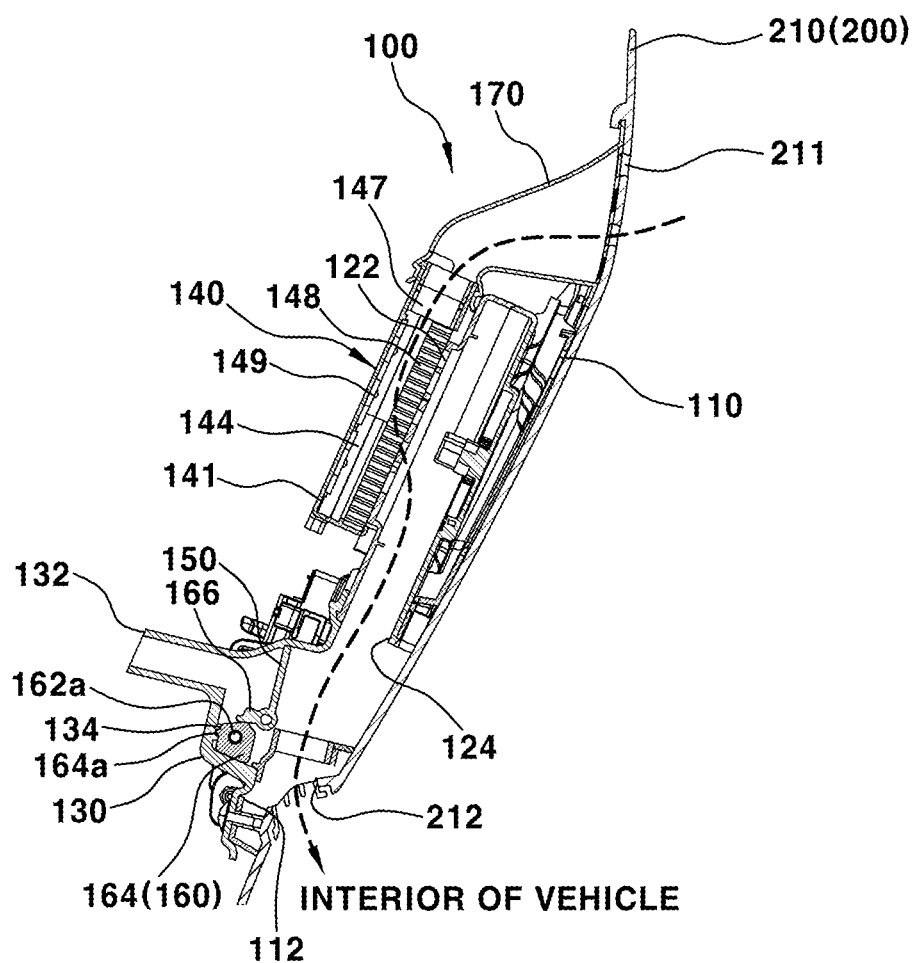
Figure 10A:
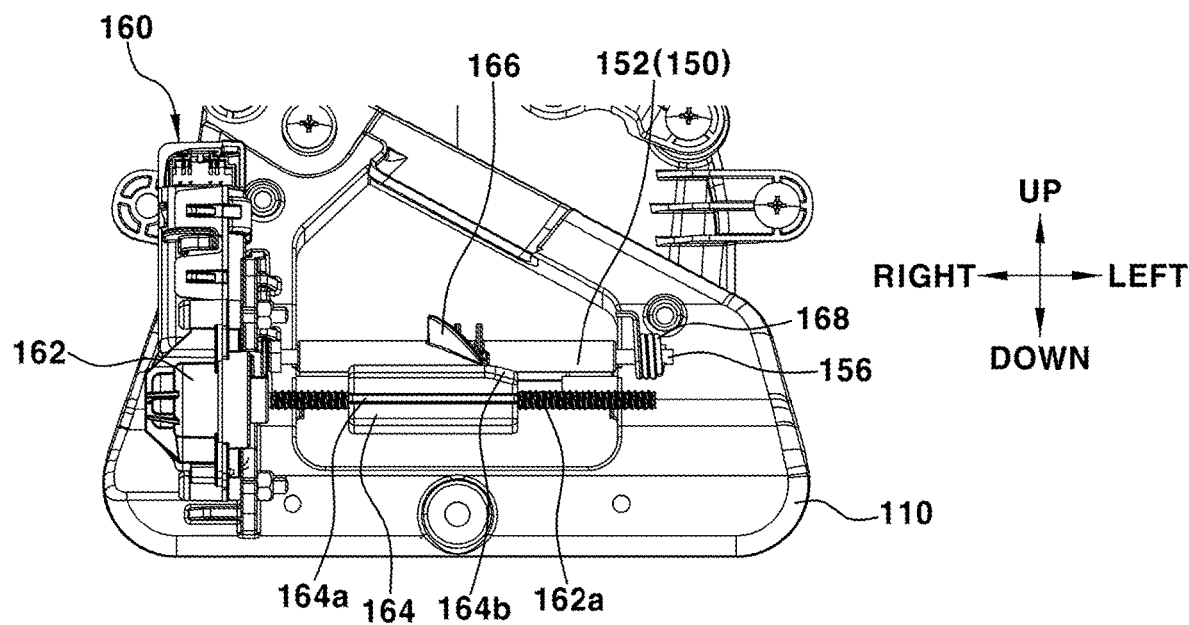
FIGS. 10A and 10B are views showing the state in which the opening and closing door is located at a position to open a seat outlet by driving of the door actuator according to one embodiment of the present disclosure.
Figure 10B:
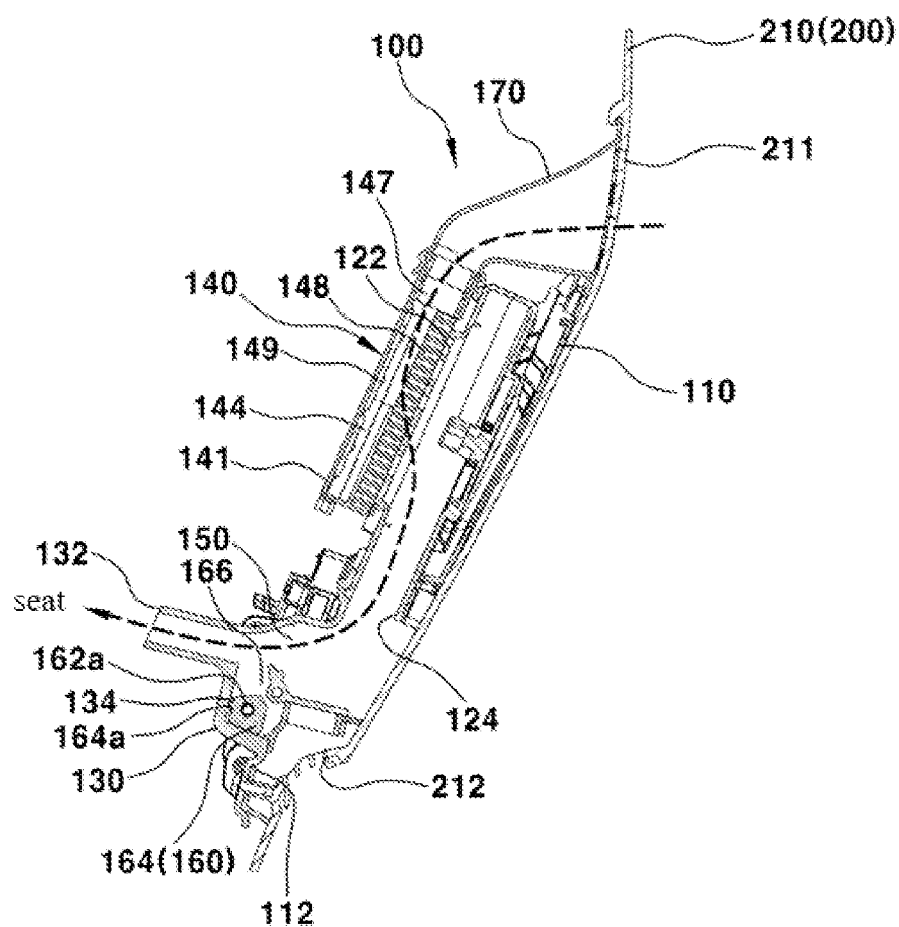

As shown in FIGS. 9A and 9B, when the opening and closing door 150 is located at the first position to open the indoor outlet 112 and to close the seat outlet 132, the air cleaning mode of the seat ventilation device 100 is implemented. Further, as shown in FIGS. 10A and 10B, when the opening and closing door 150 is located at the second position to open the seat outlet 132 and to close the indoor outlet 112, the seat ventilation mode of the seat ventilation device 100 is implemented.

In the seat ventilation mode, indoor air introduced into the inflow duct 170 passes through the air cleaning module 140, and is then discharged to the seat outlet 132 so as to be blown towards the seat 200. In the air cleaning mode, the indoor air introduced into the inflow duct 170 passes through the air cleaning module 140, and is then discharged to the indoor outlet 112 so as to be blown towards the interior of the vehicle.

The opening and closing door 150 includes a shaft holder 152 rotatably coupled to a hinge shaft 156 mounted on the cover duct 130 parallel to a rotating shaft 162a of the door actuator 160, and an air flap 154 formed integrally with the shaft holder 152. The air flap 154 opens the indoor outlet 112 when the opening and closing door 150 is located at the first position, and opens the seat outlet 132 when the opening and closing door 150 is located at the second position.

As shown in FIGS. 4 and 8, the door actuator 160 includes a motor 162, a slider 164, a wave flange 166, and a return spring 168.

The motor 162 is mounted on the side part of the base duct 110 so as to be disposed outside the cover duct 130, and generates power to rotate the opening and closing door 150. The motor 162 is driven by power supplied from a power supply (not shown) under the control of a controller 180.

The slider 164 is configured to be linearly moved along the rotating shaft 162a of the motor 162 by driving of the motor 162. The slider 164 is screwed with the rotating shaft 162a of the motor 162, and is assembled with the inside of the cover duct 130 so as to be linearly movable in the lateral direction based on the seat 200.

Here, the slider 164 has an inner circumferential surface having a threaded structure so as to be screwed with the rotating shaft 162a. Further, a guide rail 134 configured to guide the linear movement of the slider 164 is provided on the inner surface of the cover duct 130, and the slider 164 has a guide rib 164a assembled with the guide rail 134 so as to be movable along the guide rail 134.

The slider 164 is moved to one side in the lateral direction by driving of the motor 162. That is, at the time of driving the motor 162 of the slider 164, the slider 164 is moved to any one predetermined direction of the leftward direction and the rightward direction. In this embodiment, the slider 164 is moved in the leftward direction (i.e., a first direction) based on the seat 200 by driving of the motor 162.

Further, an inclined plane 164b for interlocking with the wave flange 166 is provided on the upper surface of the slider 164. The inclined plane 164b is a part with which the wave flange 166 is in contact with at all times.

The wave flange 166 is provided integrally with the opening and closing door 150, and is configured to rotate the opening and closing door 150 in the state of being interlocked with linear movement of the slider 164. The wave flange 166 protrudes in a spiral type from one side of the outer circumferential surface of the shaft holder 152 opposite the air flap 154, and has a curved plate structure which is twisted into a designated form.

The wave flange 166 is in contact with the inclined plane 164b of the slider at all times, and is pressed by the inclined plane 164b so as to be pushed, as the slider 164 is linearly moved in the leftward direction by the motor 162 in the state in which the wave flange 166 comes into contact with the lower end of the inclined plane 164b. Here, the wave flange 166 is pressed by the inclined plane 164b so as to be pushed, thereby rotating the opening and closing door 150. Therefore, the opening and closing door 150 is moved from the first position to close the seat outlet 132 and to open the indoor outlet 112 to the second position to open the seat outlet 132 and to close the indoor outlet 112. When the opening and closing door 150 reaches the second position, the wave flange 166 comes into contact with the upper end of the inclined plane 164b.

Further, the opening and closing door 150 is returned to the position before driving the motor 162 (i.e., the first position) by the elastic restoring force of the return spring 168 in the state in which the wave flange 168 comes into contact with the upper end of the inclined plane 164b. In this case, the slider 164 is moved in the rightward direction (i.e., a second direction) by driving of the motor 162 in the reverse direction to be returned to the position before driving the motor 162, and the wave flange 166 is returned to the original position thereof by the return spring 168, and thus again comes into contact with the lower end of the inclined plane 164b. When the wave flange 166 is returned to the original position thereof by the return spring 168, the wave flange 166 is rotated and moved in a direction opposite to the movement direction of the wave flange 166 pressed by the slider 164.

The motor 162 is driven in the regular direction in order to move the opening and closing door 150 to the second position, and is driven in the reverse direction in order to return the opening and closing door 150 to the first position.

The return spring 168 may be mounted on the hinge shaft 156 so as to be compressed when the opening and closing door 150 is rotated from the first position to the second position, and may prevent the opening and closing door 150 from moving at the time of rotating the opening and closing door 150 and moving at the first position or the second position after completion of rotation of the opening and closing door 150. The return spring 168 is compressed by the opening and closing door 150 moved to the second position, and thus generates elastic restoring force.

As described above, the opening and closing door 150 may be moved to any one of the first position and the second position by the linear movement of the slider 164 and the elastic restoring force of the return spring 168. The slider 164 may be moved laterally to the left (i.e., in the first direction) by driving of the motor 162 in the regular direction, and may thus move the opening and closing door 150 to the second position to open the seat outlet 132, as shown in FIGS. 10A and 10B, and may be moved laterally to the right (i.e., in the second direction) by driving of the motor 162 in the reverse direction, and may thus move the opening and closing door 150 to the first position to open the indoor outlet 112, as shown in FIGS. 9A and 9B.

The opening and closing door 150 is rotated to the same angle as the angle of rotation of the rotating shaft 162*a* of the motor 162, thus controlling the flow path of air.

Figure 11:
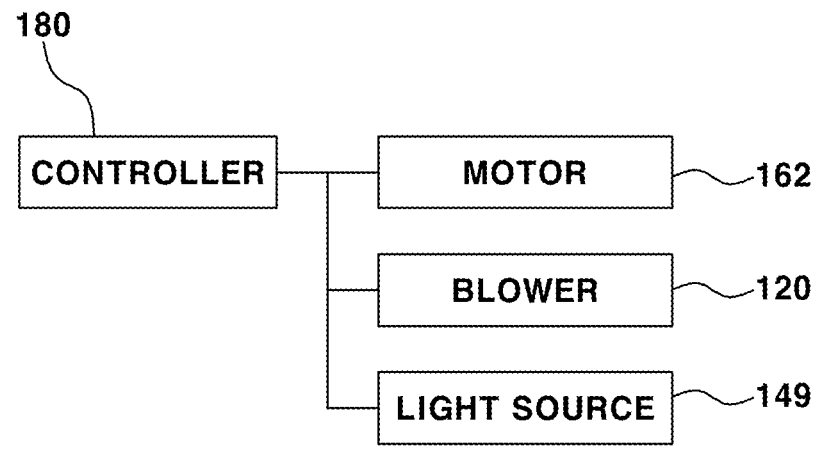
FIG. 11 is a block diagram representing elements configured to control operation of the seat ventilation device according to one embodiment of the present disclosure.
Figure 12:
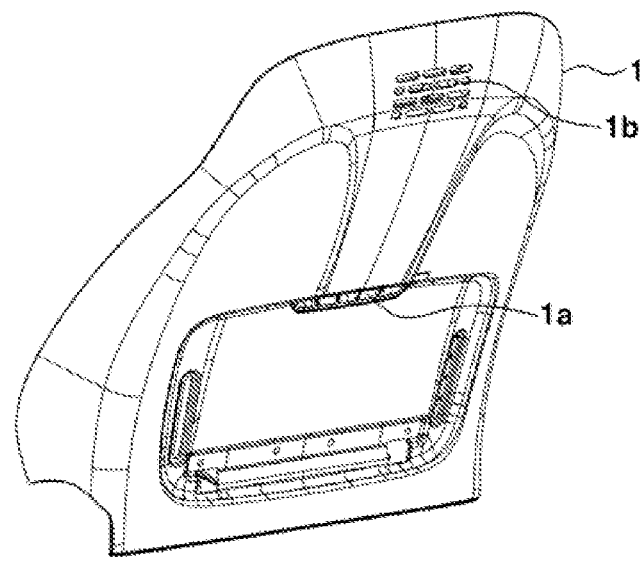
FIG. 12 is a perspective view showing a seat of a vehicle in which a conventional air cleaning module for vehicles is mounted.
Figure 13:
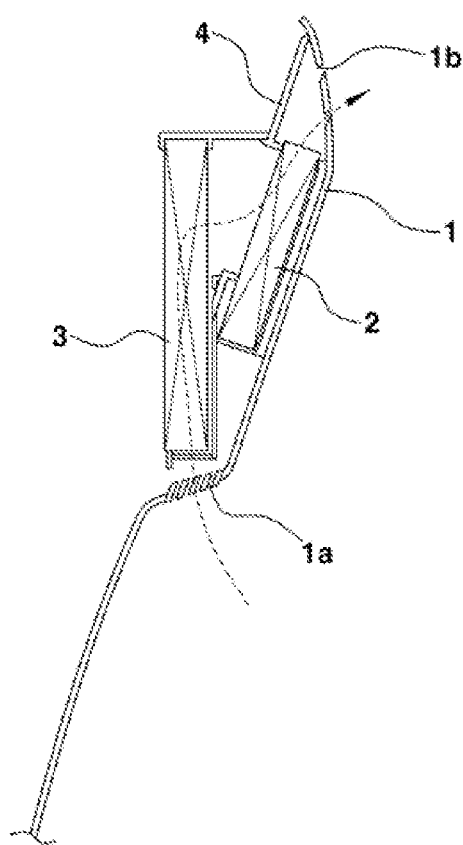
FIG. 13 is a longitudinal-sectional view showing the conventional air cleaning module.

As shown in FIG. 11, the motor 162 is connected to the controller 180, and driving of the motor 162 is controlled by the controller 180. The controller 180 determines whether or not to drive the motor 162 depending on a user input, and determines and controls the direction of movement of the slider 164 depending on driving of the motor 162. The controller 180 may control the position of the opening and closing door 150 by controlling the direction of movement of the slider 164.

The controller 180 may control driving of the motor 162 so as to move the opening and closing door 150 from the first position to the second position, or may control driving of the motor 162 so as to move the opening and closing door 150 from the second position to the first position, depending on the user input.

When the slider 164 is moved in a direction of pressing the wave flange 166 along the rotating shaft 162*a* of the motor 162, the slider 164 may move the opening and closing door 150 to the second position. Further, when the slider 164 is moved in a direction of releasing pressing of the wave flange 166 along the rotating shaft 162*a* of the motor 162, the slider may 164 may return the opening and closing door 150 to the first position.

The seat ventilation device 100 is operated in the air cleaning mode when the opening and closing door 150 is located at the first position, and is operated in the seat ventilation mode when the opening and closing door 150 is located at the second position. Further, the seat ventilation device 100 may be operated in any one of the air cleaning mode and the seat ventilation mode or may not be operated depending on whether or not a passenger gets in the vehicle or the seating position of the passenger in the vehicle.

For example, when the seat ventilation device 100 is mounted in front seats of the vehicle and passengers are seated on both the front seats and rear seats of the vehicle, the controller 180 may operate the seat ventilation device 100 in a mode selected from the air cleaning mode and the seat ventilation mode or may not operate the seat ventilation device 100 depending on a signal input by the passenger. Further, when the seat ventilation device 100 is mounted in the front seats of the vehicle and passengers are seated on only the front seats of the vehicle, the controller 180 may operate the seat ventilation device 100 in a mode selected from the air cleaning mode and the seat ventilation mode or may not operate the seat ventilation device 100 depending on a signal input by the passenger. Moreover, when the seat ventilation device 100 is mounted in the front seats of the vehicle and passengers are seated on only the rear seats of the vehicle, the controller 180 may operate the seat ventilation device 100 in the air cleaning mode or may not operate the seat ventilation device 100.

The controller 180 may operate the seat ventilation device 100 so as to prioritize the seat ventilation mode over the air cleaning mode. Therefore, when a passenger input requiring the seat ventilation mode occurs during operation of the seat ventilation device 100 in the air cleaning mode, the controller 180 converts the seat ventilation device 100 into the seat ventilation mode.

The controller 180 is electrically connected to the blower 120 and the light source 149 in addition to the motor 162, controls driving of the motor 162 and driving of the blower 120, and controls whether or not to supply power to the light source 149. Further, the controller 180 may perform overall control of the seat ventilation device 100. The controller 180 may be any one of controllers provided in the vehicle. For example, the controller 180 may be an air conditioning system controller.

When the seat ventilation device 100 is operated in the air cleaning mode or the seat ventilation mode, the blower 120 and the light source 149 are driven at all times.

As is apparent from the above description, a seat ventilation device for vehicles according to the present disclosure provides the following effects.

First, the seat ventilation device has a structure in which the function of the conventional air cleaning module and the function of the conventional seat ventilation module are integrated, thereby being advantageous in terms of space, cost and weight and being advantageous in terms of fuel economy of a vehicle compared to the conventional modules.

Second, the seat ventilation device is configured to perform both a physical filtering function and a chemical filtering function, thereby being capable of having improved filtering functions and expanding an effective environment range about the filtering functions. Concretely, the seat ventilation device may simultaneously physically and chemically remove foreign substances so as to improve air quality in the interior of the vehicle.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

The invention claimed is:

1. A seat ventilation device for vehicles comprising:
   a base duct mounted in a seat, and having an indoor outlet configured to discharge air to an interior of a vehicle;
   a blower assembled to the base duct and connected to the indoor outlet, the blower being configured to intake air in the interior of the vehicle;
   a cover duct mounted on the base duct, and having a seat outlet connected to the blower configured to discharge air to the seat;
   an air cleaning module mounted at a front end of the blower configured to filter air in the interior of the vehicle taken in through the blower; and
   an opening and closing door positioned in the cover duct, and configured to open either the seat outlet or the indoor outlet.

2. The seat ventilation device of claim 1, wherein the opening and closing door is connected to a door actuator mounted on the base duct such that power is transmittable between the opening and closing door and the door actuator, and wherein the opening and closing door is rotated from a first position to open the indoor outlet to a second position to open the seat outlet by driving the door actuator.

3. The seat ventilation device of claim 2, wherein the door actuator comprises:
   a motor mounted on the base duct and configured to generate power to rotate the opening and closing door;
   a slider assembled to an inside of the cover duct configured to be linearly movable, and screwed with a rotating shaft of the motor to be linearly moved by driving of the motor; and
   a wave flange provided on the opening and closing door, and configured to rotate the opening and closing door when interlocked with linear movement of the slider.

4. The seat ventilation device of claim 3, wherein an inclined plane is provided on an upper surface of the slider, and the wave flange contacts the inclined plane at all times, and wherein the wave flange is pressed due to movement of the slider in a first direction to move the opening and closing door from the first position to the second position.

5. The seat ventilation device of claim 3, wherein the opening and closing door is mounted in the cover duct by a hinge shaft, and a return spring compressed by the opening and closing door rotated and moved to the second position is mounted on the hinge shaft.

6. The seat ventilation device of claim 5, wherein the wave flange moves the opening and closing door from the second position to the first position by an elastic restoring force of the return spring, when the slider is moved in a second direction by driving of the motor.

7. The seat ventilation device of claim 3, wherein a guide rail configured to guide the linear movement of the slider is provided on an inner surface of the cover duct, and the slider has a guide rib connected to the guide rail to be movable along the guide rail.

8. The seat ventilation device of claim 3, wherein the motor is controlled by a controller, and the controller controls driving of the motor depending on a user input to move the opening and closing door from the first position to the second position.

9. The seat ventilation device of claim 1, wherein the air cleaning module comprises:
   a housing having a filter inlet, a sterilization space configured such that air is introduced thereinto through the filter inlet, and a filter outlet configured to discharge air having passed through the sterilization space to the blower;
   a filter member mounted at the filter inlet, and configured to filter out foreign substances from the air introduced into the sterilization space;
   a photocatalytic member including a substance comprising a photocatalyst and located in the sterilization space, and configured to sterilize air when light is radiated to the photocatalytic member; and
   a light source mounted in the housing, and configured to radiate light to the photocatalytic member.

10. The seat ventilation device of claim 9, wherein the filter inlet is connected to an inflow duct configured to receive the air in the interior of the vehicle, and the inflow duct is connected to an inflow hole of the seat such that air is flowable between the inflow duct and the inflow hole.

11. The seat ventilation device of claim 1, wherein the cover duct is mounted on the base duct to completely cover the indoor outlet.

12. The seat ventilation device of claim 1, wherein the indoor outlet is connected to a discharge hole of the seat such that air is flowable therebetween, and wherein the indoor outlet discharges air to the interior of the vehicle through the discharge hole.

* * * * *